(12) United States Patent
Czornyj et al.

(10) Patent No.: US 8,220,861 B2
(45) Date of Patent: Jul. 17, 2012

(54) CONVERTIBLE VEHICLE BODY

(75) Inventors: Taras Czornyj, Enhörna (SE); Martin Johansson, Vargön (SE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/375,673

(22) PCT Filed: Jul. 7, 2007

(86) PCT No.: PCT/EP2007/006032
§ 371 (c)(1),
(2), (4) Date: Oct. 14, 2009

(87) PCT Pub. No.: WO2008/014869
PCT Pub. Date: Feb. 7, 2008

(65) Prior Publication Data
US 2010/0032979 A1  Feb. 11, 2010

(30) Foreign Application Priority Data

Jul. 29, 2006 (EP) .................................. 06015841

(51) Int. Cl.
B60J 7/00 (2006.01)
(52) U.S. Cl. .......... 296/107.01; 296/107.08; 296/107.16
(58) Field of Classification Search ............. 296/107.01, 296/107.08, 107.16, 107.17
See application file for complete search history.

(56) References Cited

U.S. PATENT DOCUMENTS

| | | | |
|---|---|---|---|
| 4,277,098 A | 7/1981 | Gibney | |
| 6,257,650 B1 | 7/2001 | Lee et al. | |
| 6,312,041 B1 | 11/2001 | Queveau et al. | |
| 6,422,637 B1 | 7/2002 | Mac Farland | |
| 7,156,446 B2 | 1/2007 | Perakis | |
| 7,404,587 B2 | 7/2008 | Brockhoff | |
| 7,455,347 B2 | 11/2008 | Heselhaus et al. | |
| 2002/0105205 A1 | 8/2002 | Willard et al. | |
| 2009/0091161 A1 | 4/2009 | Ugolini et al. | |
| 2010/0072776 A1 | 3/2010 | Czornyj et al. | |

FOREIGN PATENT DOCUMENTS

| | | |
|---|---|---|
| DE | 603558 C | 10/1934 |
| DE | 20107371 U1 | 1/2002 |
| DE | 10233765 A1 | 2/2004 |
| DE | 10254366 A1 | 6/2004 |

(Continued)

OTHER PUBLICATIONS

German Patent Office, German Search Report for Application No. 102006052852.2, dated Aug. 29, 2007.

(Continued)

*Primary Examiner* — Lori L Lyjak
(74) *Attorney, Agent, or Firm* — Ingrassia Fisher & Lorenz, P.C.

(57) ABSTRACT

A vehicle body is provided that includes, but is not limited to a frame and a roof held above the frame so as to be movable between a closed configuration in which it covers a passenger compartment and an open configuration in which the passenger compartment is uncovered. The passenger compartment has at least one door. At least one pair of pillars is mounted to the frame to the rear of the door for supporting the roof in its closed configuration. The roof is adapted to assume an intermediate configuration between its open and closer configurations in which the roof is spaced apart from said pillars.

17 Claims, 4 Drawing Sheets

FOREIGN PATENT DOCUMENTS

| | | | |
|---|---|---|---|
| DE | 69916788 | T2 | 9/2004 |
| DE | 102004005591 | A1 | 8/2005 |
| DE | 102004063378 | A1 | 12/2005 |
| DE | 10200055404 | A1 | 1/2006 |
| DE | 102004055404 | A1 | 1/2006 |
| DE | 102004057898 | A1 | 6/2006 |
| DE | 60306558 | T2 | 11/2006 |
| EP | 1092579 | A1 | 4/2001 |
| EP | 1882606 | A2 | 1/2008 |
| WO | 03076222 | A1 | 9/2003 |
| WO | 2005032867 | A2 | 4/2005 |
| WO | 2005061253 | A1 | 7/2005 |

OTHER PUBLICATIONS

International Searching Authority, International Search Report for Application No. PCT/EP2007/006032, dated Nov. 13, 2007.

International Searching Authority, International Search Report for European Application No. PCT/EP2007/006653, dated Jan. 11, 2008.

USPTO, Non-final Office Action issued in U.S. Appl. No. 12/375,674, dated Jun. 29, 2011.

Response to U.S. Non-final Office Action for U.S. Appl. No. 12/375,674, dated Sep. 29, 2011.

USPTO, Non-final Office Action for U.S. Appl. No. 12/375,674, dated Nov. 4, 2011.

CONVERTIBLE VEHICLE BODY

CROSS-REFERENCE TO RELATED APPLICATIONS

This application is a U.S. National-Stage entry under 35 U.S.C. §371 based on International Application No. PCT/EP2007/006032, filed Jul. 7, 2007, which was published under PCT Article 21(2) and which claims priority to European Application No. 06015841.7, filed Jul. 29, 2006, which are all hereby incorporated in their entirety by reference.

TECHNICAL FIELD

The present invention relates to a convertible vehicle body, more specifically to a vehicle body having a lower body portion, an upper body portion which is formed of pillars and windows including a rear window and which surrounds a passenger compartment, and a roof which is displaceable between a closed configuration in which it covers said passenger compartment and an open configuration in which it is displaced to the rear of said lower body portion.

BACKGROUND

In most cabriolet type vehicle bodies, passengers on rear seats are ill protected from headwind when the vehicle body is in its open configuration, because in this configuration usually not only the roof itself, but also the rear window is folded back.

In order to cope with this problem, a convertible vehicle body of hatchback type has been proposed in which the roof is displaceable in a rearward direction from a closed configuration in which it covers a passenger compartment into an open configuration in which it is held in close proximity to the rear portion of the vehicle body. This design is not satisfactorily applicable to a notchback body, since guiding means for the roof cannot be conveniently provided. Further, in the open configuration the roof tends to cover the rear window, whereby the driver's view to the rear is impaired.

At least one object of the present invention is to provide a design for a convertible vehicle body which provides a comfortable headwind protection for back seat passengers and which is applicable to a vehicle body of the notchback type. In addition, other objects, desirable features, and characteristics will become apparent from the subsequent summary and detailed description, and the appended claims, taken in conjunction with the accompanying drawings and this background.

SUMMARY

In a vehicle body of the type described in the background, the at least one object is achieved in that the roof is connected to the lower body portion by arms which in the closed configuration are located within the passenger compartment and which are movable into the open configuration through gaps at either side of the rear window. By means of these arms, the roof may be lifted out of a position in which it covers the passenger compartment and deposited in the rear of the rear window into a position in which it does not obstruct the view through the rear window, while passenger compartment keeps an essentially closed circumference that provides a shield against headwind for all passengers.

For stably guiding the movement of the roof, it is preferred that each arm is coupled to the roof by a first joint and to the lower body portion by a second joint, the joints having axes extending transversally with respect to the vehicle body, that the first joints are spaced apart in the longitudinal direction of the vehicle body and that the second joints are spaced apart in said longitudinal direction.

For improving the stability of the roof, the pillars may comprise rear pillars which support the roof in the closed configuration and from which the roof is detachable for moving into the open configuration.

In case of a roof, which comprises a main segment supported by said arms and a rear segment, which is movably connected to the main segment, such additional support by the rear pillars is particularly desirable for the rear segment.

The rear segment is preferably movable into a position in which it overlaps with said main segment, in order for the segments to form a compact unit which can be easily lifted away from the passenger compartment without a risk of interference with other parts of the vehicle body.

The movable connection between main and rear segments preferably is of a pivoting type.

The main segment may further be movably connected to a front segment which, in the closed configuration, extends to a front window of the vehicle body. Thus, the unit which is to be lifted away from the passenger compartment can be made still more compact.

It is particularly preferred that the rear pillars should be displaceable between a position in which they fill said gaps between said rear window and side windows of the vehicle body and a position in which the gaps are open for the arms to pass. In this way, the circumference of the passenger compartment may be completely uninterrupted, in open and closed configurations alike, providing excellent headwind protection.

It is further preferred that the pillars be movable into an idle position in which the pillars are located inside the lower body portion, so that, when the vehicle is moving while the rear pillars are not in their roof supporting position, they do not form an obstacle to the headwind, which might cause undesirable noise and fuel consumption.

The idle position of the pillars may conveniently be inside a boot in the rear of the lower vehicle body portion.

For receiving the pillars and, eventually, the roof in its open configuration, the boot preferably has a boot lid, which is pivotable about an axis adjacent to a rear edge of said boot lid.

According to a preferred embodiment, the pillars are mounted on the boot lid, so that when the boot lid is opened, the pillars will be raised. In this raised position, the pillars can easily be moved into their idle position without interfering with other parts of the vehicle body.

For the sake of simplicity, the pillars preferably are pivotable between their roof supporting position and their idle position.

For controlling the intensity of headwind to a level which is comfortable for rear seat passengers, the rear window may be moveable into a position in which it is at least partially concealed within the lower body portion at least while the roof is in its open configuration.

For concealing the rear window inside the lower body portion, it may, for example, be linearly displaceable or rotatable.

In its concealed position, the rear window may conveniently be located in a boot of the lower body portion.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background and summary or the following detailed description.

Figure 1:
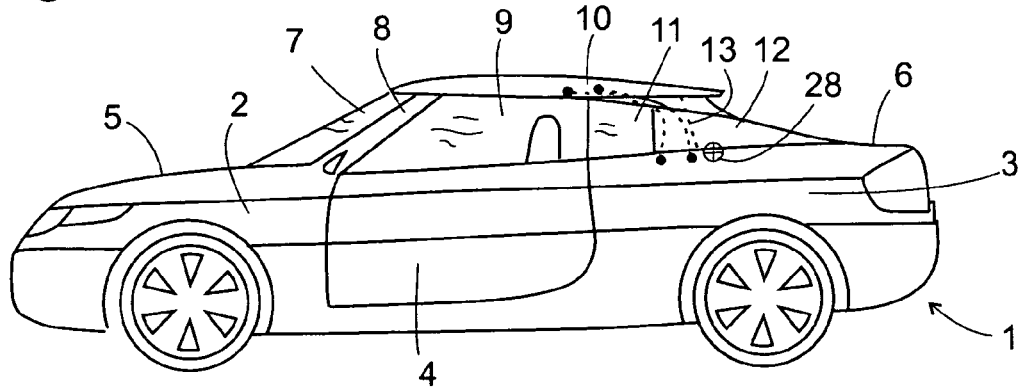
FIG. 1 is a side view of a motor vehicle according to the present invention, with its roof in a closed configuration.

FIG. 1 is a side view of a vehicle body according to a present invention, illustrating a closed configuration. The vehicle body has a lower body portion 1 comprising front and rear wings 2, 3, doors 4 engine bonnet 5 and a boot lid 6. A windscreen 7 is held between A-pillars 8. Each door 4 carries a window pane 9 which is displaceable between an elevated position in which its upper rim is in contact with a roof 10 and a withdrawn position in which the window pane 9 is concealed within the body of door 4. Similarly, a window pane 11 mounted at rear wing 3 is displaceable between an elevated position, shown, and a withdrawn position inside rear wing 3. To the rear of window pane 11, there are two C-pillars 12. The vehicle body further has a rear window 13 which in the perspective of FIG. 1 is concealed by the C-pillar 12 which faces the viewer, so that it is represented by a phantom line only. It is noted that the C-pillars 12 extend over a considerable length in the longitudinal direction of the vehicle, and that they extend to the rear far beyond the rear window 13, conferring to the vehicle body a hatchback silhouette, although the steep orientation of the rear window is that of a notchback. and C-pillars 8, 12 support roof 10 but are not permanently attached to it. A latch or the like may be provided in order to temporarily lock the roof 10 to the A- and C-pillars 8, 12.

Figure 2:
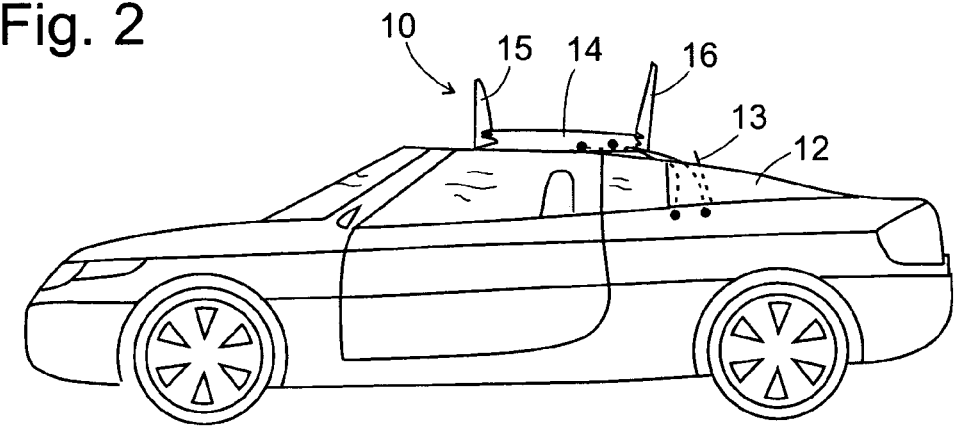
FIG. 2 illustrates the vehicle with its roof in an intermediate stage between closed and open configurations.

As can be seen in FIG. 2, the roof 10 is formed of three segments, a main segment 14 in the centre and front and rear segments 15, 16, which, in the embodiment shown, are foldably connected to the main segment 14. In an alternative embodiment, the front and rear segments might be linearly displaceable with respect to the main segment (e.g., by means of guiding rails or the like) in order to bring them into a stacked configuration.

Figure 3:
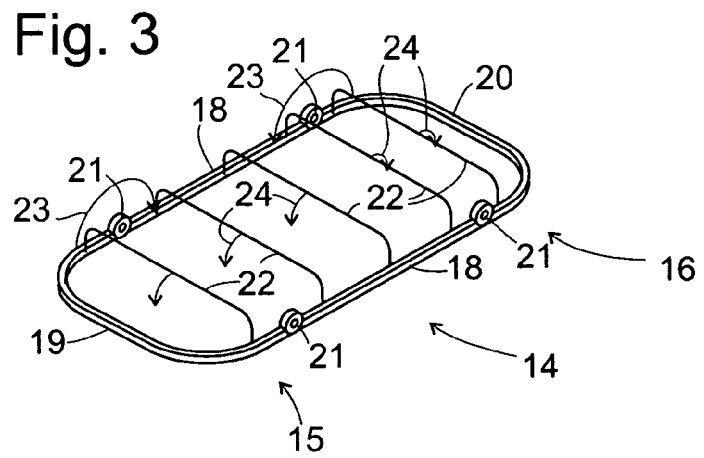
FIG. 3 is a perspective view of the roof structure, without tarpaulin.

A general structure of the roof 10 having the foldable segments 14, 15, 16 is illustrated in FIG. 3. A support structure of the roof 10 comprises two rigid lateral metal beams 18 the ends of which are connected to arc-shaped front and rear beams 19, 20 by hinges 21. In the configuration shown, beams 18, 19, 20 essentially lie in a same plane and form a roughly rectangular frame. A tarpaulin, not shown, has its edges fixed to this rectangular frame. The tarpaulin is further supported by arc-shaped webs 22, which extend between the two longitudinal beams 18 or between parallel end portions of the front beam 19 or the rear beam 20. In the configuration shown, the webs 22 stand upright so as to keep the tarpaulin under tension. The webs 22 are rotatably held at beams 18, 19, 20, and they are coupled to the hinges 21 such that when the front and rear beams 19, 20 are folded on top of the longitudinal beams 18, as indicated by arrows 23, the webs 21 will rotate towards the plane of the beams 18, 19, 20 holding them as illustrated by arrows 24, causing the tarpaulin to slacken and enabling the front and rear beams 19, 20 to lie flat on the longitudinal beams 18.

Figure 4:
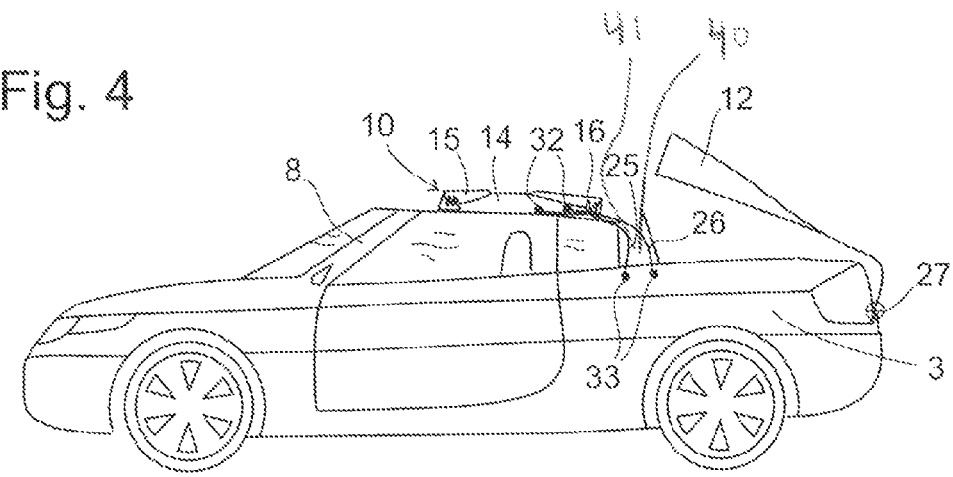
FIG. 4 is a side view of the vehicle, in which segments of the roof are folded one above the other, and the trunk lid is open in order to receive the folded roof.

FIG. 4 illustrates the configuration of the vehicle when the front and rear beams 19, 20 lie flat on the longitudinal beams 18 of the main segment 14. The roof 10 is folded into a compact package. This package is no longer supported by any of the A- and C-Pillars 8, 12, but exclusively by two pairs of arcuate webs 25, 26, which, as can be seen in FIG. 1, extend near inner sides of the C-pillars 12 as long as the roof 10 is closed and are connected to the longitudinal beams 18 of the main segment 14 by first articulated joints 32, on the one hand, and to an appropriate support of the vehicle frame 1, on the other, by second articulated joints 33. The joints 32, 33 have axes extending in the transversal direction of the vehicle body.

In FIG. 4, the boot lid 6 is opened by pivoting it around an axis 27 located near a rear edge of the boot lid 6. For completeness, it should be noted that the boot lid 6 is also pivotable around an axis 28 (see FIG. 1) located near its front edge, for loading and unloading the boot. Since this kind of operation of the boot lid 6 is familiar to the skilled person, it is not shown in the drawing.

Figure 5:
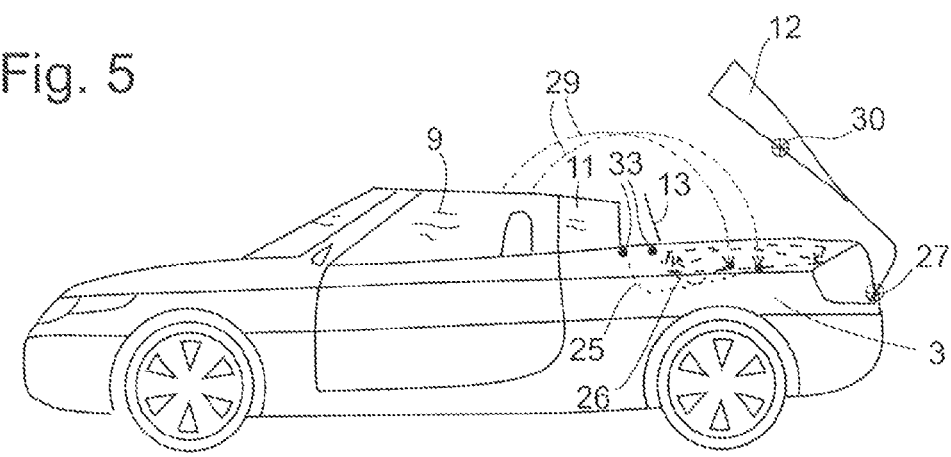
FIG. 5 illustrates the vehicle with the folded roof placed in the trunk.

By turning the webs 25, 26, the folded roof 10 is swung into the boot, as indicated by arrows 29 in FIG. 5. In turning, the webs 25 and 26 pass though a first and second gag 40, 41 created between each end of the rear window 13 and side window 11 by the upward and rearward movement of the C-pillars 12. Since the quadrangle formed by the four axes of the joints 32, 33 has an essentially rhomboid shape, the folded roof rotates only little when it is swung into the boot and assumes an orientation inside the boot in which it is parallel to the boot lid 6 in its closed position. When the roof 10 has been placed in the boot, the boot lid 6 is closed again, and the rear window 13 is slightly moved down, so that its upper edge becomes flush with that of the C-pillars 12, yielding the configuration of FIG. 6. In this configuration, the passenger compartment is still delimited by side and rear windows 9, 11, 13 and the C-pillars 12, but the roof 10 is completely removed.

Figure 6:
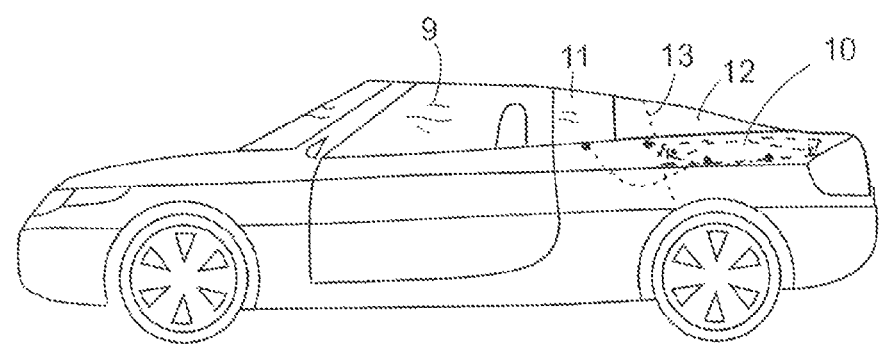
FIG. 6 illustrates the vehicle in a first open configuration in which the pillars are in a support position.

It should be noted that although the C-pillars 12 are shown to be mounted to the boot lid 6 in FIGS. 4 and 5, a configuration similar to that of FIG. 6 might also be achieved in case of C-pillars mounted to the rear wings 3.

According to a preferred embodiment, the C-pillars 12 are not fixed to the boot lid 6, but are rotatable with respect to the boot lid 6 around an axis which extends in the transversal direction of the vehicle body and is denoted 30 in FIG. 5.

Figure 7:
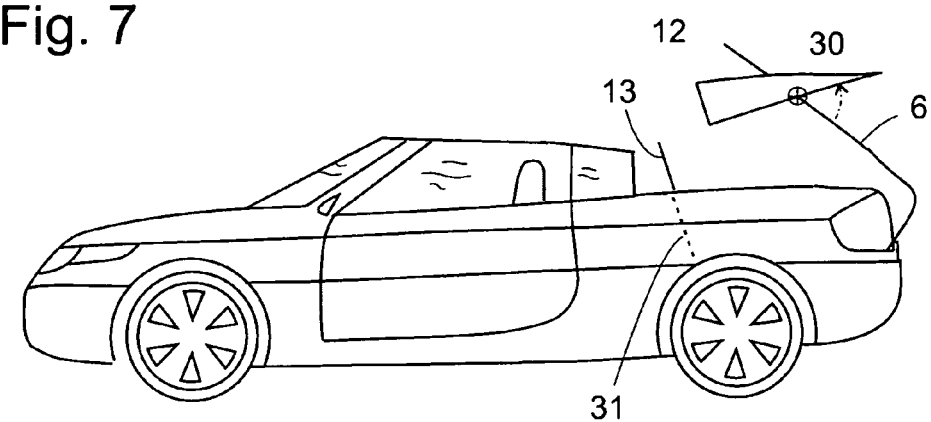
FIG. 7 is a side view of the vehicle illustrating the process of moving the pillars into their idle position.
Figure 8:
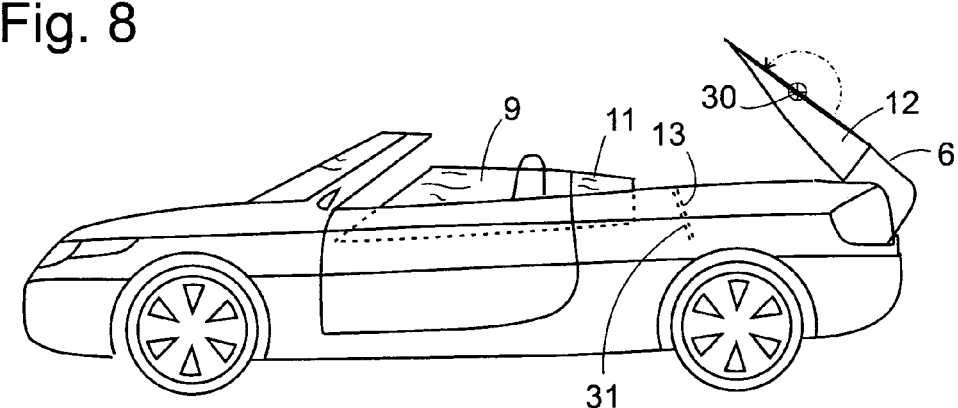
FIG. 8 illustrates a configuration of the vehicle in which the pillars are in the idle position with respect to the boot lid, and the boot lid is open.
Figure 9:
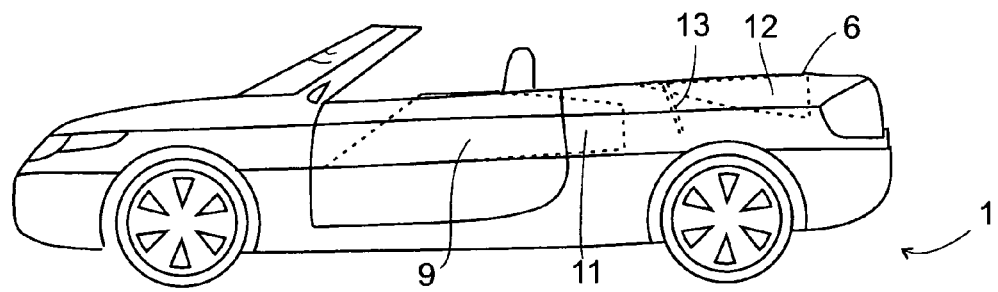
FIG. 9 illustrates a second open configuration of the vehicle, in which the pillars are in their idle position.

FIGS. 7-9 illustrates intermediate configurations which is reached if, starting from the configuration of FIG. 5, the C-pillars 12 are rotated around axis 30. When the C-pillars 12 are rotated by approximately 180°, as shown in FIG. 8, they are located entirely underneath the boot lid 6, and a bottom side of the C-pillars 12 is flush with the boot lid 6. Window panes 9, 11 are lowered to an intermediate position, and the rear window 13 is withdrawn completely into the lower body portion 1. In its withdrawn position, the rear window 13 may conveniently be located inside the boot, e.g. adjacent to a front wall 31 of the boot. By closing the boot lid 6 and lowering further the window panes 9, 11, a second open configuration illustrated in FIG. 9 is obtained, in which not only the roof 10 but also the window panes 9, 11 and the C-pillars 12 have disappeared inside the vehicle frame 1, yielding a vehicle body of a classical cabriolet type.

Figure 10:
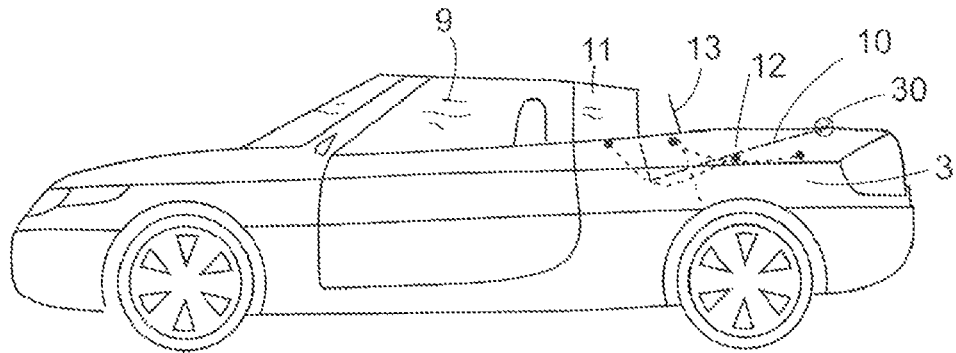
FIG. 10 is a side view of the vehicle in an open configuration according to a second embodiment of the invention.

FIG. 10 is a side view of a vehicle body according to a second embodiment. It differs from the embodiment of FIGS. 1 to 9 in that the C-pillars 12 are not mounted on the boot lid, but, quite conventionally, on rear wings 3. The C-pillars are rotatable around an axis 30 near their rear ends between an upright position, as shown in FIG. 2, and an idle position, as shown in FIG. 10.

Figure 11:
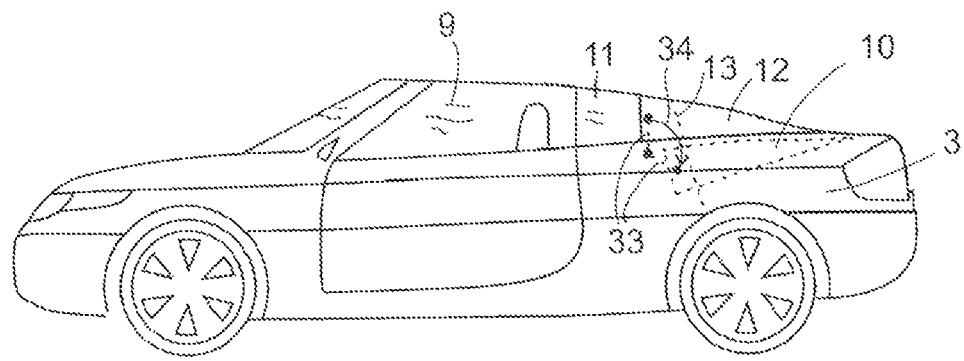
FIG. 11 is a side view analogous to FIG. 9 according to a third embodiment.

In an alternative embodiment shown in FIG. 11, a rear end of each C-pillar 12 is slidably held in a guiding rail, not shown, fixed to an inner side of the rear wings, and a front end of each C-pillar 12 is displaceable between a roof supporting position in which it is supported by a substantially vertically oriented connecting rod 33 and an idle position by turning the connecting rod 33 as indicated by arrow 34.

Figure 12:
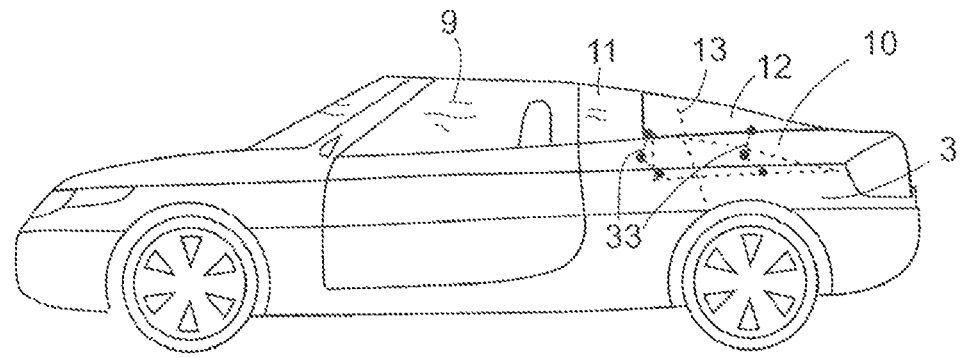
FIG. 12 is a side view analogous to FIG. 9 according to a fourth embodiment.

In the embodiment of FIG. 12, there are two connecting rods 33 forming a trapezoid linkage between C-pillar 12 and rear wing 3. By rotating the two rods 33, the C-pillar 12 is transferred from its roof supporting position to the idle position inside the boot and back again.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A vehicle body, comprising:
a lower body portion;
an upper body portion formed of pillars and windows including a rear window, a first side window and a second side window that surround a passenger compartment, the first side window forming a first gap with an end of the rear window and the second side window forming a second gap with an opposing end of the rear window; and
a roof configured to cover the passenger compartment and configured to be displaceable between a closed configuration and an open configuration, wherein in the open configuration the roof is displaced to the rear of said lower body portion,
wherein further, the roof is connected to the lower body portion by arms which in the closed configuration are located within the passenger compartment and which are movable into the open configuration through the first gap and the second gap.

2. The vehicle body of claim 1, wherein each arm is coupled to the roof by a first joint and to the lower body portion by a second joint, the joints having axes extending transversally with respect to the vehicle body, and that the first joints are spaced apart in the longitudinal direction of the vehicle body and that the second joints are spaced apart in said longitudinal direction.

3. The vehicle body of claim 1, wherein the pillars comprise rear pillars which support the roof in the closed configuration and from which the roof is detachable for moving into the open configuration.

4. The vehicle body of claim 3, wherein the roof comprises a main segment supported by said arms and a rear segment which is movably connected to the main segment, and wherein the rear pillars, in the closed configuration, support said rear segment.

5. The vehicle body of claim 4, wherein said rear segment is movable into a position in which it overlaps with said main segment.

6. The vehicle body of claim 4, wherein said main and rear segments are pivotably connected.

7. The vehicle body of claim 4, wherein the main segment is movably connected to a front segment which, in the closed configuration, extends to a front window of the vehicle body.

8. The vehicle body of claim 1, wherein the pillars comprise rear pillars which are displaceable between a position in which they fill said first gap and said second gap between said rear window and side windows of the vehicle body and a position in which said first gap and said second gap are open for the arms to pass.

9. The vehicle body of claim 8, wherein the rear pillars are movable into an idle position in which they are located inside the lower body portion.

10. The vehicle body of claim 9, wherein the idle position of the rear pillars is inside a rear boot of the lower body portion.

11. The vehicle body of claim 10, wherein the boot has a boot lid which is pivotable about an axis adjacent to a rear edge of said boot lid.

12. The vehicle body of claim 11, wherein the pillars are mounted on the boot lid.

13. The vehicle body of claim 3, wherein the rear pillars are pivotable between their roof supporting position and their idle position.

14. The vehicle body of claim 1, wherein the rear window is moveable into a position in which the rear window is at least partially concealed within the lower body portion at least while the roof is in its open configuration.

15. The vehicle body of claim 14, wherein the rear window is linearly displaceable.

16. The vehicle body of claim 14, wherein the rear window is rotatable.

17. The vehicle body of claim 14, wherein when the rear window is in the at least partially concealed position, the rear window is located in a boot of the lower body portion.

* * * * *